United States Patent
Rudi et al.

(10) Patent No.: US 6,788,492 B2
(45) Date of Patent: Sep. 7, 2004

(54) WIDE TAPE DRIVE FOR A WIDE TAPE HOLDING FRAME

(75) Inventors: Guttorm Rudi, Fjellhamar (NO); Ladislav Rubas, Tranby (NO)

(73) Assignee: O-Mass AS, Oslo (NO)

( * ) Notice: Subject to any disclaimer, the term of this patent is extended or adjusted under 35 U.S.C. 154(b) by 334 days.

(21) Appl. No.: 10/052,826

(22) Filed: Nov. 7, 2001

(65) Prior Publication Data

US 2003/0086201 A1 May 8, 2003

(51) Int. Cl.$^7$ .......................... G11B 15/00; G11B 5/008; G11B 17/00
(52) U.S. Cl. ............................... 360/90; 360/93
(58) Field of Search .............................. 360/88, 93, 90, 360/131, 132, 134; 242/341, 342, 335, 347, 358, 345

(56) References Cited

U.S. PATENT DOCUMENTS

| | | | |
|---|---|---|---|
| 6,267,313 B1 | 7/2001 | Saliba et al. | 242/345 |
| 6,522,500 B1 * | 2/2003 | Rudi | 360/132 |
| 6,545,840 B2 * | 4/2003 | Rudi et al. | 360/132 |

* cited by examiner

Primary Examiner—Julie Anne Watko
(74) Attorney, Agent, or Firm—Schiff Hardin LLP

(57) ABSTRACT

A wide tape drive for use with a wide tape holder having a frame with an open top and an open bottom non-permanently closed with a top cover and a bottom cover, releasably held together and releasably held to the frame by snap connections respectively disposed at lateral sides of the holder, the wide tape holder containing two tape hubs rotatably mounted therein proceeding substantially parallel to the lateral sides of the frame, has a base plate with two guides projecting substantially perpendicularly from the base plate which receive the wide tape holder therebetween. The drive has at least one drive motor having a drive shaft disposed between the guides, which is inserted to and engages one of the tape hubs. A magnetic read/write head is mounted on a head position assembly between the guides, and orients the read/write head relative to the tape when the wide tape holder is inserted in the tape drive. Two grippers are mounted on the guides to engage the snaps at the lateral sides of the holder as the holder is moved between the guides, thereby releasing the snaps to free the top cover and the bottom cover from the frame. Two lifer mechanisms also are respectively mounted on the guides, and respectively engage the top cover and the bottom cover after they are freed from the frame, to move these covers away from the frame, thereby producing a spacing in the drive between the top cover and the bottom cover which allows all of the magnetic tape in the wide tape holder to be wound on one of the hubs.

16 Claims, 8 Drawing Sheets

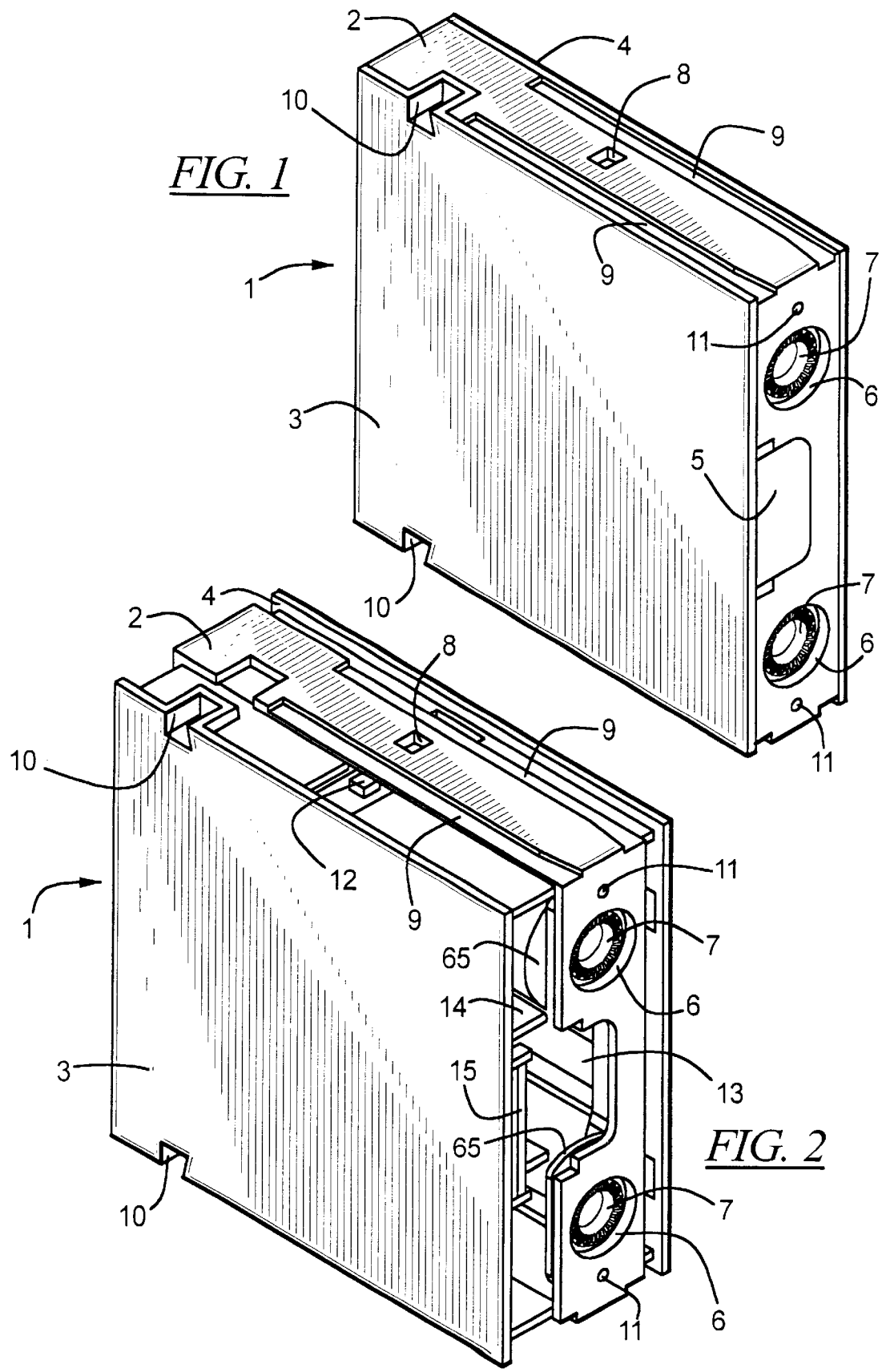

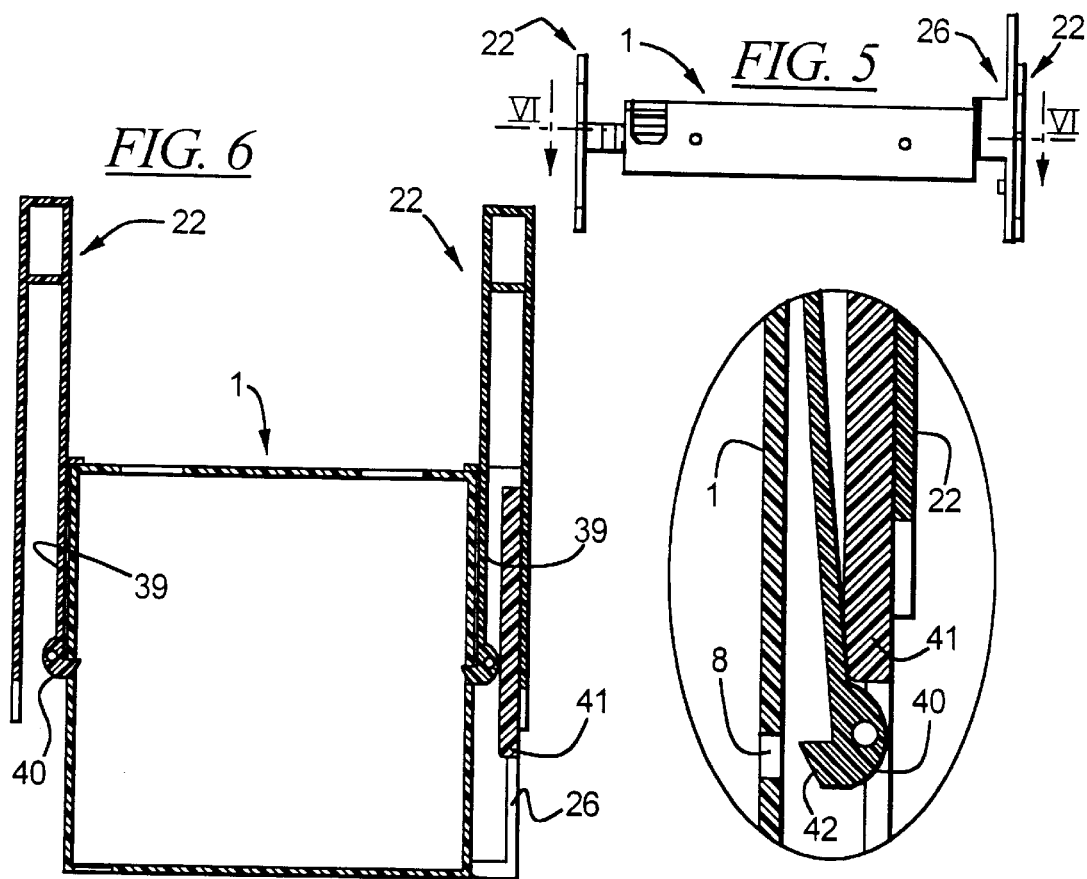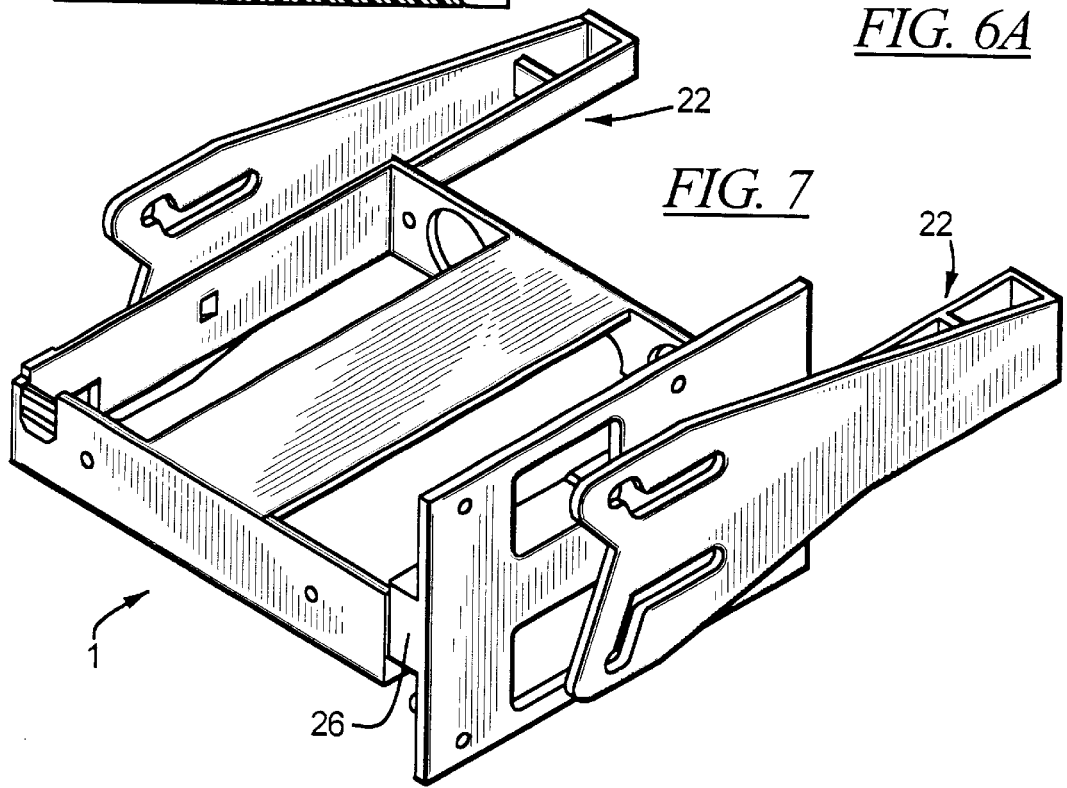

WIDE TAPE DRIVE FOR A WIDE TAPE HOLDING FRAME

BACKGROUND OF THE INVENTION

1. Field of the Invention

The present invention relates to a tape drive for wide magnetic recording tape.

2. Description of the Prior Art and Related Applications

The use of magnetic tape as a medium for data recording has the significant advantages of a relatively low cost and a relatively large recording surface area. Nevertheless, conventional magnetic tape has certain disadvantages associated therewith.

A first of these disadvantages is that tape is a sequential medium, which means that when a data transfer head is located at a beginning of a tape, it is necessary for the tape to be transported along its entire length in order to retrieve (or re-write) information at the end of the tape.

A second disadvantage is that, due to the desire and necessity of storing as much data as possible within an available tape area, the data transfer head technology as well as the recording media technology are pushed to their quality limits.

Moreover, many existing drives and cartridges must be designed within specified form factors, in order to satisfy standardization requirements. As an increasing number of functions become available, which are desired to be accommodated in a drive or on a tape, data storage area or other functions must be sacrificed to accommodate the new, additional functions, or some type of compromise must be reached in the overall design.

Among the more important market requirements which are expected in the near future for data storage on tape is that the need for higher storage capacity will continue to increase, at an even faster rate than previously. As discussed below, for example, the storage capacity of a currently available single cartridge is not sufficient for unattended backup during a longer period of time, and therefore so-called autoloader systems have been developed to automatically insert and remove a number of cartridges in a sequence.

Further market requirements are expected to be a need for faster time to access data, a need for an increased data transfer rate, a lower cost per MB (megabyte) and an overall improved quality and reduced cost.

As noted above, the limited data storage capacity of conventional cartridges has resulted in the development of autoloader systems. Conventional autoloader systems, however, are not a satisfactory solution to the problem of storing a large amount of data in an unattended backup procedure over a relatively long period of time. Several disadvantages exist with regard to currently available autoloader systems.

Because such autoloader systems make use of a large number of cartridges, the cartridges are made relatively small, and therefore have a limited space available for use for data storage. Typically, six to ten of such cartridges must be put in a magazine in order to have sufficient storage area (capacity). Because of the relatively small size of the cartridges, the drive is also made small, in order to match standardized form factors. The drive is disposed in a system housing, which also contains robotics, electronics and software needed for loading an unloading the cartridges.

The relatively large number of components, and therefore the relatively high cost, associated with conventional autoloader systems makes the use of such systems an unattractive alternative for a customer who merely wants long term data backup.

To address these problems, a tape cartridge and a drive for extremely wide tape are disclosed in co-pending U.S. application Ser. No. 09/691,165, filed Oct. 19, 2000 (now U.S. Pat. No. 6,522,500, the teachings of which are incorporated herein by reference. The tape cartridge and drive described therein accommodate tape having an extremely wide width, such as a width that is greater than approximately 24 mm, or in a range between approximately 24 mm and approximately 127 mm.

The width of this extremely wide tape, therefore, is greater than that of a conventional magnetic recording tape by a factor of 6 to 10 times. Because the tape has this extremely wide width, the total tape length can be made significantly shorter while still making the same total area available for data storage. Making the tape shorter, however, requires less time for winding and unwinding the tape from the hubs on which it is carried in order to access data at a particular location on the tape.

It is important, however, that the housing for accommodating such extremely wide tape have the same, or substantially the same, form factor as conventional recording cartridges, so as to be accommodated in the openings for conventional tape cartridges in tape drives and auto loaders and magazines. This means that the axes of rotation of the tape hubs in cartridges for accommodating extremely wide tape will proceed parallel to a "longer" dimension of the cartridge housing, rather than perpendicular to the shortest dimension (height) as in a conventional cartridge housing. Given a length of extremely wide tape which is necessary to provide the same total area available for recording data on the tape as a conventionally sized tape, such a length of extremely wide tape can be accommodated in a housing having a height which is comparable to the height of a conventional tape cartridge only when the tape is substantially evenly distributed in respective tape packs on the two hubs in the housing. When any significant amount of extremely wide tape is wound onto one of the hubs, the diameter on the tape pack on that hub increases beyond the standard height of a conventional cartridge housing.

This problem could be addressed by simply providing a lesser length of extremely wide tape in the cartridge, so that even when all of the tape is wound on one tape hub in one tape pack, the diameter of that tape pack still would not exceed the height of a standard tape cartridge.

This would defeat one of the advantages of employing extremely wide tape, however, by decreasing the total area available for recording data.

To address this problem a tape cartridge is disclosed in co-pending U.S. application Ser. No. 09/859,328, filed May 16, 2001 (now U.S. Pat. No. 6,545,840, which accommodates an amount of extremely wide tape therein having a total area available for data recording which is substantially the same as the area available for data recording in a conventional tape cartridge, and which has a form factor which is substantially the same as the form factor for a conventional tape cartridge. The tape cartridge disclosed in this co-pending application has a housing with two tape hubs rotatably mounted therein with wide magnetic recording tape wound thereon for winding and unwinding between the two hubs in a tape transport direction, with the housing being composed of first and second housing parts which are movable relative to each other in a direction perpendicular to the tape transport direction and which is also perpendicular to the rotational axes of the hubs, to accommodate an increase in diameter of the tape pack on one of the hubs which arises as the extremely wide tape is wound onto that hub. The housing thus can expand in the movement direction.

This problem also is addressed in a co-pending United States application filed simultaneously herewith having Ser. No. 10/052,839 (now U.S. Pat. No. 6,450,434 which discloses a tape holder formed by a four-sided frame in which two tape hubs are disposed, with wide magnetic recording tape wound thereon for winding and unwinding between the hubs in a tape transport direction. The frame therefore does not form a housing in the conventional sense because it does not have a top and a bottom which are permanently fixed to the sides of the frame. The frame may be provided with a top cover and a bottom cover for protecting the recording tape from dust and other contamination during storage, however, if such covers are used, they do not have a permanent connection to the frame, and are only held in place by a snap arrangement, so that during use of the frame in the drive, the covers are separated from the frame and therefore the frame is open at the top and at the bottom, and the diameter of the respective tape packs on the hubs is therefore not constrained by any fixed housing dimensions.

SUMMARY OF THE INVENTION

It is an object of the present invention to provide a wide tape drive which is suitable for use with a wide tape holding frame, as disclosed in the aforementioned co-pending application having Ser. No. 10/052,839 (now U.S. Pat. No. 6,450,434 filed simultaneously herewith. This object is achieved in accordance with the principles of the present invention in a wide tape drive having drive motors with respective drive shafts for engaging the two hubs in the tape holding frame, and having two guide arms, respectively disposed on opposite sides of the drive motors, which engage and interact with the tape holding frame as it is inserted into the drive to simultaneously release a snap connection holding the top end bottom covers to the frame, and to separate the top and bottom covers from the frame so that there is no impediment to all of the tape in the tape holding frame being wound onto one of the hubs, with a tape pack diameter exceeding the height of the frame.

As noted above, the wide tape holding frame has tape hubs with oblong flanges having a shorter dimension which approximates the height of the tape holding frame and a longer dimension which exceeds the height of the tape holding frame and allows all of the tape to be wound in a single tape pack on one of the hubs. The tape drive in accordance with the invention has a light transmitter/receiver system for detecting whether a reflective surface on the hubs is oriented behind a sight opening in the tape holding frames, so as to detect whether the flanges are oriented with their longest dimension proceeding parallel to the side of the tape holding frame, or in a position substantially perpendicular to the aforementioned position.

The tape drive also has a detector for interacting with a manually actuatable slide element on the wide tape holding frame, to detect a position of that slide element. Depending on the detected position, the drive will either inhibit or enable writing of data on the tape in the wide tape holding frame. Data which is not to be erased or overwritten can thus be protected by actuating the slide element.

In one embodiment, each of the guide arms has a gripper hook thereon, which engages an opening in the side of the tape holding frame to pull the tape holding frame into the drive. After the tape holding frame has been pulled a certain distance into the drive, this gripper hook is forced to project further into the opening, thereby releasing the snap connection which holds the top and bottom covers to the frame. As the wide tape holding frame is pulled further into the drive, lifters which are pivotably mounted at each guide arm respectively engage the top and bottom covers, and separate them from the frame. Thus, when the wide tape holding frame is fully inserted into the drive, it has no impediment at the top or bottom of the frame restricting the diameter of the tape pack which can be wound onto either of the hubs. The mechanism operates in reverse when the wide tape holding frame is removed from the drive, to replace the top and bottom covers, and allow the snap connection to re-engage to hold the covers together on the frame.

DESCRIPTION OF THE DRAWINGS

FIG. 1 is a perspective view of a wide tape holding frame, for use in the inventive drive, with the top and bottom covers held to the frame by a snap connection.

FIG. 2 is a perspective view of the wide tape holding frame of FIG. 1, as it appears after insertion in the inventive drive, with the snap connection released so that the top and bottom covers are separated from the frame.

FIG. 5 shows the wide tape holding frame inserted into the inventive drive, as seen from the drive access opening, with surrounding components not being illustrated.

FIG. 6 is a sectional view as indicated by the arrows in FIG. 5.

FIG. 6A is a detail from FIG. 6.

FIG. 7 is a perspective view showing the basic arrangement of the wide tape holding frame and the guide arms, when the wide tape holding frame is inserted in the inventive drive, with other components being removed.

DESCRIPTION OF THE PREFERRED EMBODIMENTS

Figure 3:
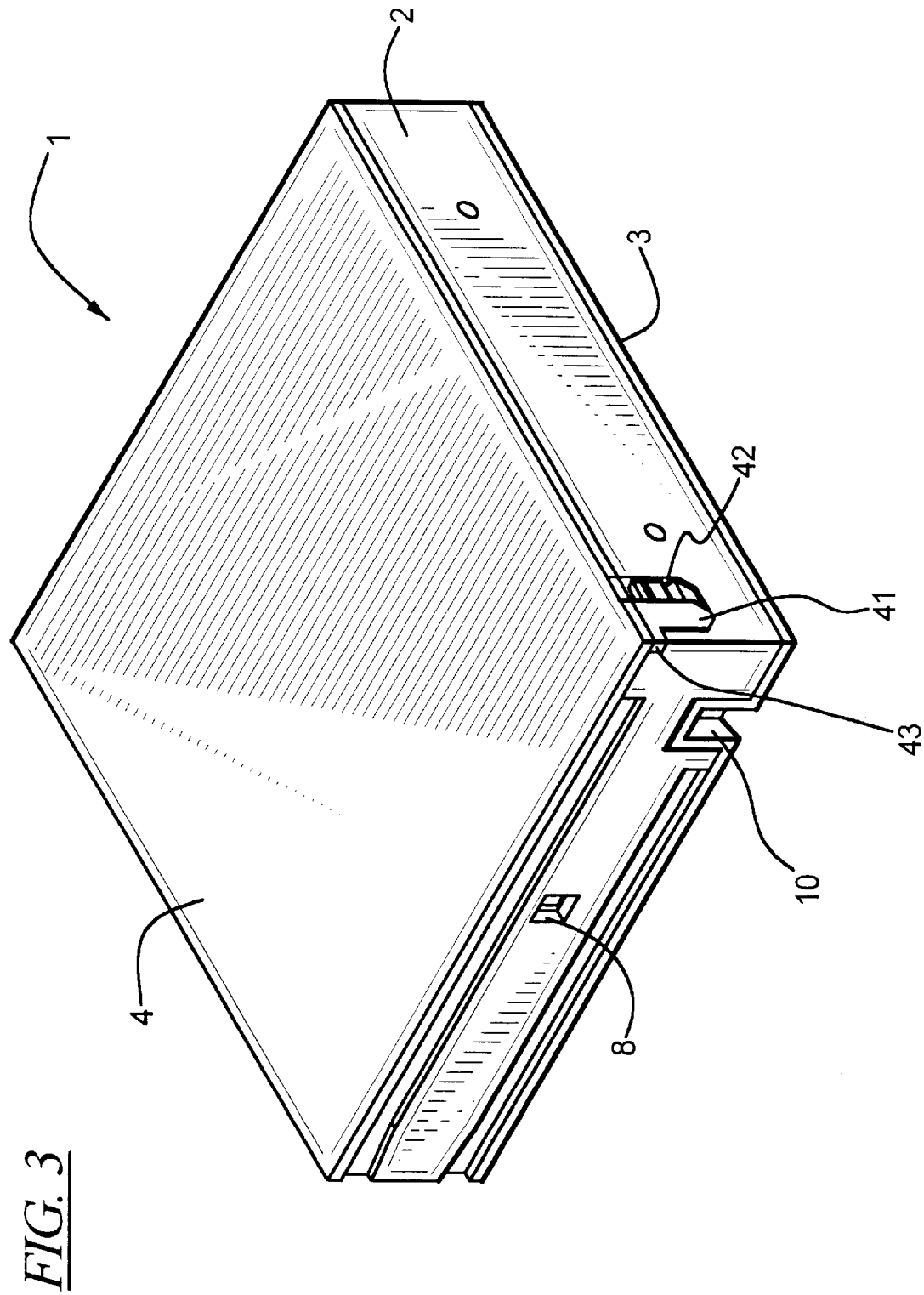
FIG. 3 is a rear perspective view of the wide tape holding frame of FIG. 1, showing a slide for right protection.

The wide tape holding frame and cover assembly 1 shown in FIG. 1 has a rectangular frame 2 with a bottom cover 3 and a top cover 4. One side of the frame 2 has a hinged access door 5, which allows tape guides and a read/write head element to be inserted, as described below. This side of the frame 2 also has access openings 6 respectively in registration with tape hubs 7 that are rotatably mounted in the frame 2. The access openings 6 allow respective drive shafts 19 of a tape drive 16 (See FIG. 4) to be inserted into the tape hubs 7, as also described in more detail below.

Each lateral side of the frame 2 has an opening 8 therein, which serves two purposes. The opening 8 serves as a gripper recess during loading of the cartridge into a drive 16, as described in more detail below, and also serves as an access opening for receiving projection 12 (see FIG. 2) on the bottom cover 3, as also described in more detail below.

Figure 4:
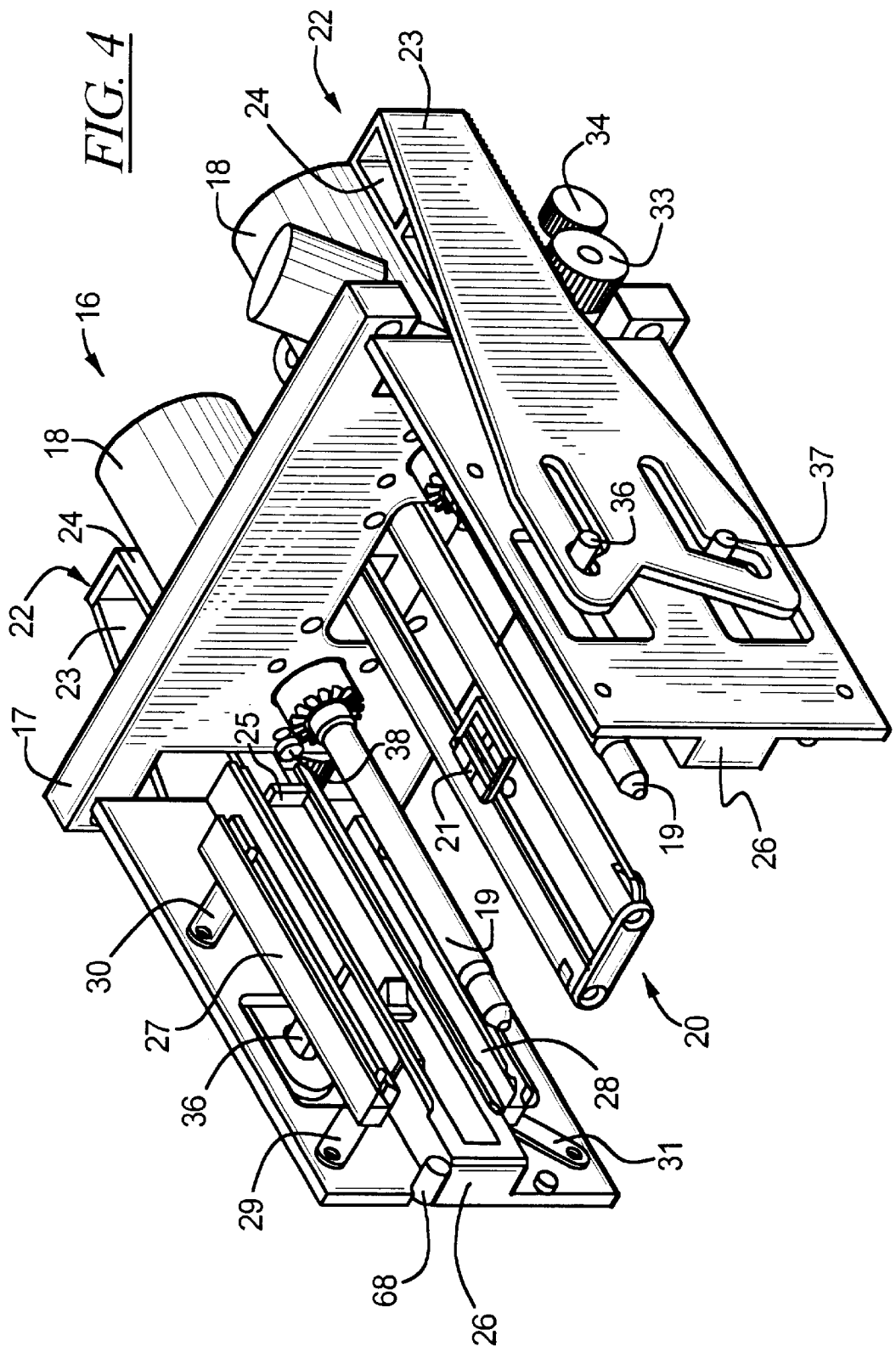
FIG. 4 shows the internal components of a wide tape drive constructed and operating in accordance with the principles of the present invention, in a perspective view with the housing removed.

Each lateral side of the frame 2 also has grooves 9 which respectively receive projecting surfaces of cartridge guide arms 26 of the drive 16 (see FIG. 4).

Recesses 10 are also formed in the bottom cover 3 and the frame 2 which serve as notches for robotic handling of the frame 2, with or without the covers 3 and 4.

The side of the frame 2 in which the access door 5 and the access openings 6 are disposed also has sight openings 11, the purpose of which is described below.

Each tape hub 7 has a shaft with an internal bore therein for receiving a drive shaft 19 (see FIG. 4) and flanges 65 (see FIG. 11) at opposite ends. On each tape hub 7, one of flanges 65 is disposed adjacent to the side of the frame 2 in which the access openings 6 are present, and has toothed projections for engagement with the tape drive 29 in a known manner.

Each of the flanges 65 which are adjacent to the side of the frame 2 containing the access opening 6, has a reflective surface thereon which, when that flange 65 is oriented within the confines of the frame 2 (as shown in FIG. 1) is disposed behind the sight opening 11. The reflective surface has a different reflection characteristic from the remainder of the material of the flange 65, such as by being a different color. Light transmitter/receiver arrangements 38 (see FIGS. 4 and 8) in the tape drive 16 determine when the flange 65 (and thus the flange 65 at the opposing end of the tape hub 7 as well) is oriented as shown for the lower flange 65 in FIG. 2, or at an angle relative to that position to accommodate an increased diameter of tape wound on the hub 7, as shown for the upper flange 65 in FIG. 2.

The frame 2 with the tape hubs 7 therein can be used by itself in an environment which is suitably dust-free and contamination-free. The covers 3 and 4 are optional, for providing a complete enclosure the magnetic recording tape wound on the tape hubs 7, when necessary.

The dimensions of the frame 2 with equal amounts of tape 13 wound on the respective tape hubs 7 are approximately 4"×4"×0.8". In a write/read operation mode, the maximum tape pack diameter can be approximately 0.9". The frame 2 alternatively can have dimensions of 4"×5". If the top and bottom covers 3 and 4 are used, the cartridge dimensions therewith are approximately 4"×4"×1". The distance between the outside surfaces of the covers 3 and 4 in the write/read position (shown in FIG. 2) is approximately 1.6". This means that the cartridge will fit into a standard form factor drive.

As shown in FIG. 3, a slide element 41 is movable back and forth in an opening 42 in the backside of the frame 2. The element 41 has a tab 43 which, depending on position of the element 41, is either flush with or recessed from a side surface of the frame 2. The status (flush or recessed) of the tab 43 is detectable by suitable means (optical, sonic, etc.) in the drive 16. Depending on the position of the slide element 41 in the opening 42, which is manually set, the drive will enable or disenable writing of data on the tape 23, thereby preventing an inadvertent alteration of previously recorded data.

The expanded assembly 1 is shown in FIG. 2, to illustrate the position of the components when it is in a drive 16 (the surrounding drive not being shown in FIG. 2) for conducting a read or write operation. The top and bottom covers 3 and 4 have been separated by the frame 2 by a mechanism in the tape drive 16 described below. This mechanism presses through the access opening 8 in each side of the frame 2, thereby pressing against the projection 12 and releasing the bottom cover 3 from the frame 2. The projection 12 is mounted on a flexible flap, which has a flange at its end which engages an opening in an inner flange of the top cover 4. When the projection 12 is pressed to release it from the access opening 8, this also causes the flap to flex, thereby also releasing the flange from the opening, thereby freeing the top cover 4 from the frame 2 as well.

Figure 11:
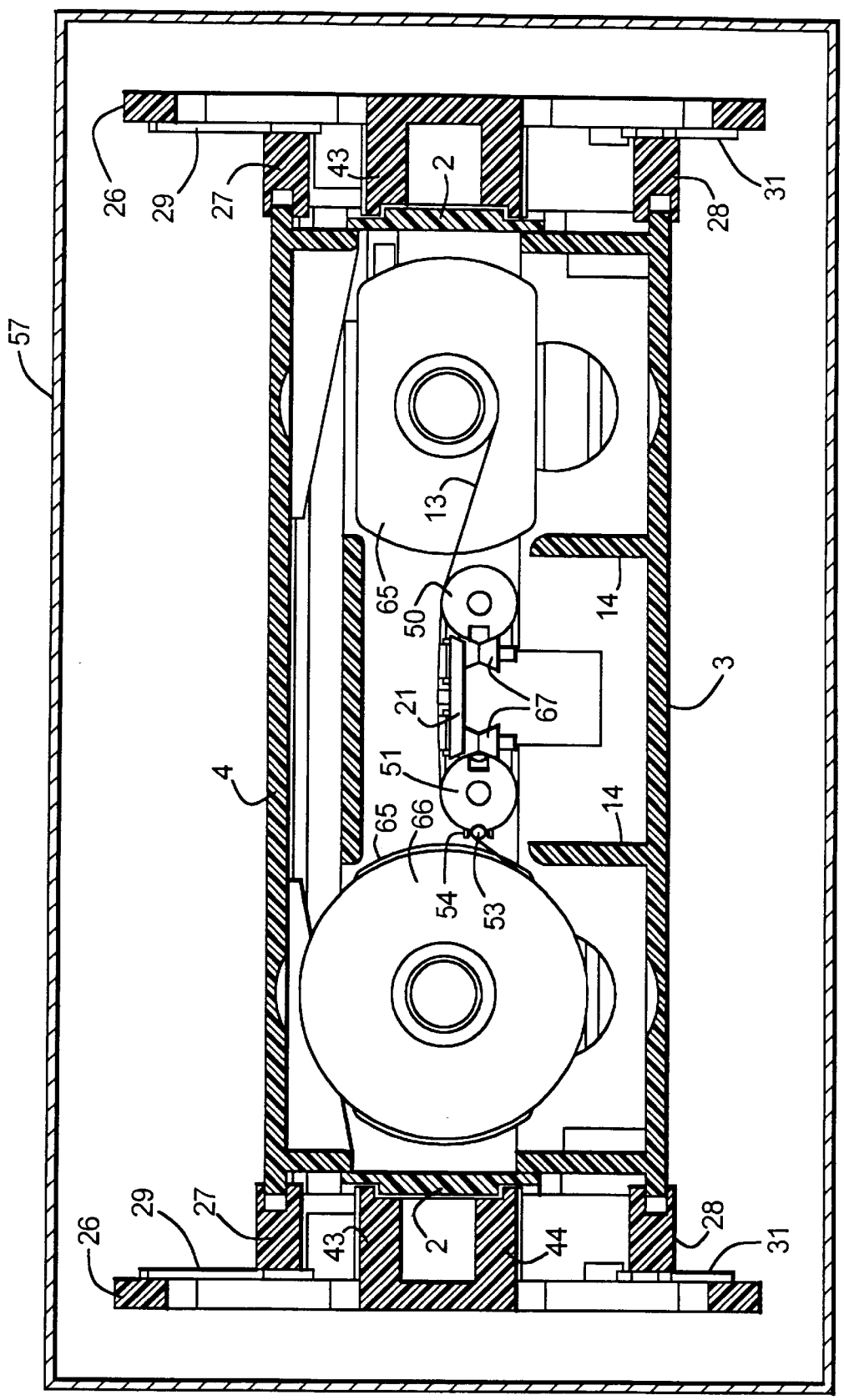
FIG. 11 is a sectional view showing the wide tape holding frame, with the top and bottom covers separated from the frame in the drive.

As can be seen in FIG. 2 as well as in the cross-sectional view in FIG. 11, the bottom cover 3 has tape guides 14 projecting inwardly therefrom, which hold the tape 13 in a position for engagement with the write/read head 21 (shown in FIG. 4) in the write/read mode. In the write/read mode only writing may take place, or only reading, or both. If the top and bottom covers 3 and 4 are not used, the tape guides 14 can be mounted to project inwardly from the frame 2. The axle 15 for the access door 5 also can be seen as projecting inwardly from the bottom cover 3.

In the expanded condition shown in FIG. 2, all of the tape 13 is wound onto one of the tape hubs 7, with the flange 65 thereof, being rotated approximately perpendicularly to the position shown in FIG. 1, wherein equal amounts of tape 13 are wound on the two hubs 7. The rotation of the flanges takes place during the initial startup of the transport motion of the tape 13, with a small amount of friction being present at that time, which is all that is needed to rotate the flanges 18 by approximately one-quarter rotation.

The internal components of the wide tape drive 16 in accordance with the invention are shown in FIG. 4, with the housing removed. The drive 16 has a base plate 17 to which drive motors 18 are mounted. Each drive motor 18 has a drive shaft 19. A head positioning assembly 20 is disposed between the drive shafts 19, and is also mounted to the base plate 17.

A wide tape holding assembly 1 of the type shown in FIGS. 1–3 is inserted into the drive 16 in a direction proceeding from the lower left corner of FIG. 4, with insertion proceeding toward the base plate 17. Upon insertion of the wide tape holding assembly 1 into the drive 16, the drive shafts 19 proceed through the respective access openings 6 and engage the respective tape hubs 7. Simultaneously, the access door 5 is pushed open by the head positioning assembly 21, so that the read/write head 21, carried by the assembly 20, is positioned to engage the tape 13 between the tape hubs 7. Mirror-symmetric frame guides 26 are mounted to the base plate 17, each of these guides 26 carrying a separating mechanism 22. The separating mechanisms 22, like the guides 26, are mirror symmetric. When a wide tape holding assembly 1 of the type shown in FIGS. 1 through 3 is inserted into the drive 16 from a direction proceeding from the lower left corner of FIG. 4 toward the base plate 17, guide blocks mounted on the guides 26 engage the respective lateral sides of the wide tape holding assembly 1, and projecting rails 43 and 44 on these blocks respectively engage the grooves 9 in these lateral sides. In each guide block of each guide 26, between these projecting rails 43 and 44, is a channel. An interior leg 24 of the separating assembly 22 slides in this channel. Each separating assembly 22 also has an exterior leg 23, joined to the interior leg 24 by a short section, so as to form a generally U-shaped element, when viewed from above or below as can be seen in FIG. 6 and FIG. 7.

After the wide tape holding assembly 1 has been manually inserted a certain distance into the drive 16, the leading side (during insertion) thereof comes to abut against a projection 25 carried by the interior wall 24. When the wide tape holding assembly 1 has been inserted by this distance, it is in the position relative to the separating assemblies 22 as shown in FIG. 6. The wide tape holding assembly 1 in this position in the drive is also shown in FIG. 5, as seen through the access opening (described below) in the drive 16. Other components have been removed from FIG. 5, for clarity.

When the wide tape holding assembly 1 is in the position shown in FIG. 6, gripper elements 40, each carrying a gripper hook 42, engage the respective access openings 8 in the lateral sides of the frame 2 of the wide tape holding assembly 1. As shown in detail 6A, each gripper element 40 is disposed at the distal end of the inner wall 24 of the separating assembly 22, which is biased in the manner of a leaf spring so as to normally urge the gripper head 40 outwardly. As the wide tape holding assembly 1 is further pushed into the drive 16, the separator assemblies 22 are also pushed relative to the guides 26, by virtue of the abutment of the wide tape holding assembly 1 against the projections 25. This causes the gripper head 40 to eventually move against a projecting portion 41 of each guide 26 (only one thereof being shown in FIG. 6). This forces the gripper hook 42 of the gripper head 40 into the access opening 8. This serves two functions. The engagement of the gripper hook 42 in the opening 8 positively engages the inserted wide tape holding assembly 1 with each of the separator assemblies 22. Secondly, the gripper hook 42 has a thickness which is greater than the thickness of the lateral wall of the frame 2, so that the gripper hook 42 pushes against the projection 12 carried by the bottom cover 3, which is in registration with, and normally engages, the opening 8. As noted above, this projection 12 is mounted on a flexible flap of the cover 13, which has a distal end carrying a flange that engages an opening in the top cover 4. When the gripper hook 42 presses on the projection 12 through the opening 8, it not only disengages the projection 21 from the access opening 8, thereby freeing the snap connection between the frame 2 and the bottom cover 3, but it also flexes the flap on which the projection 12 is mounted, thereby also disengaging the flange at the distal end thereof from the opening in the top cover 4, thereby freeing the top cover 4 from the frame 2.

Figure 8:
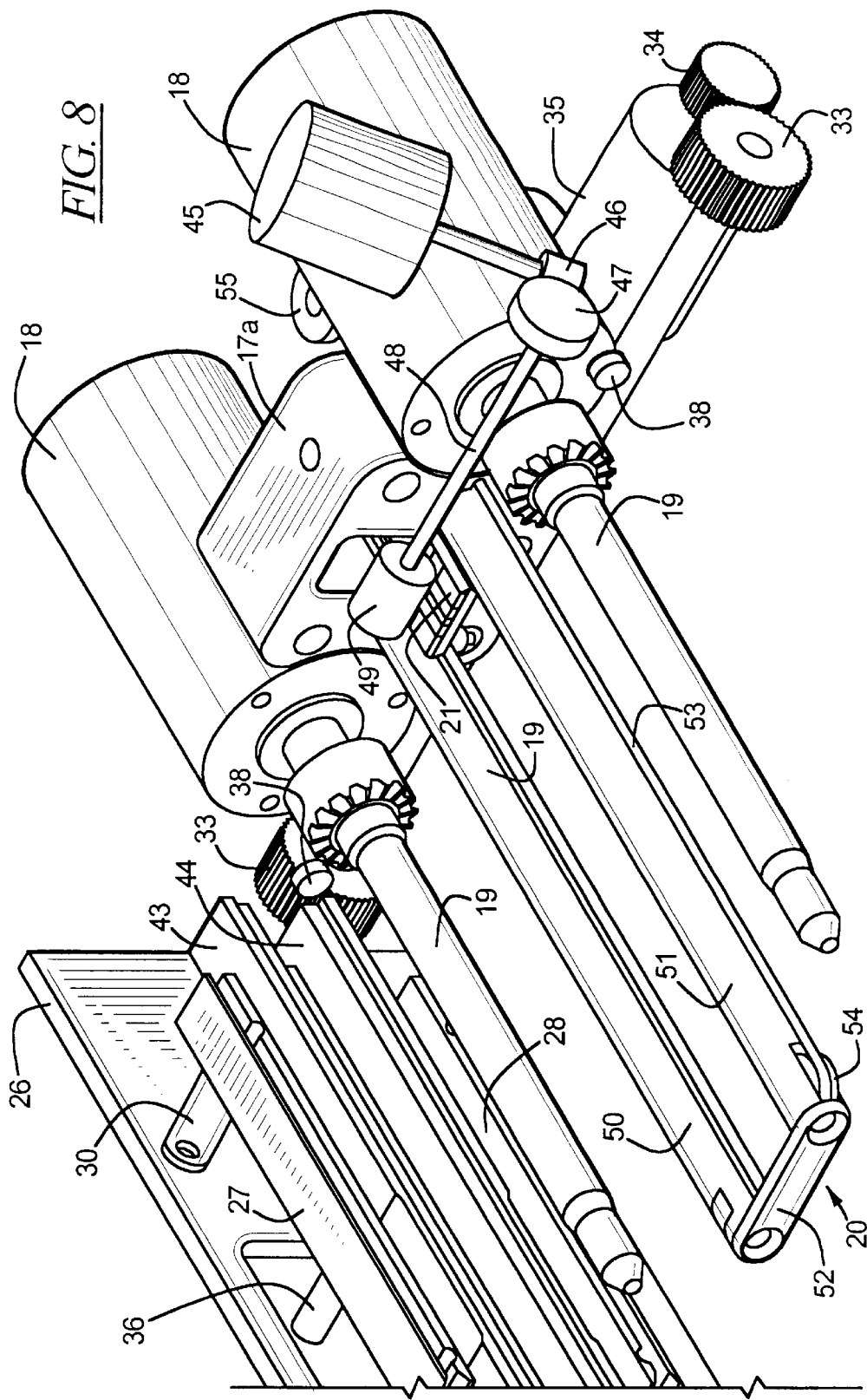
FIG. 8 is an enlarged perspective view, with the base plate and one of the guide arms being removed, for explaining the operation of the inventive drive.
Figure 9:
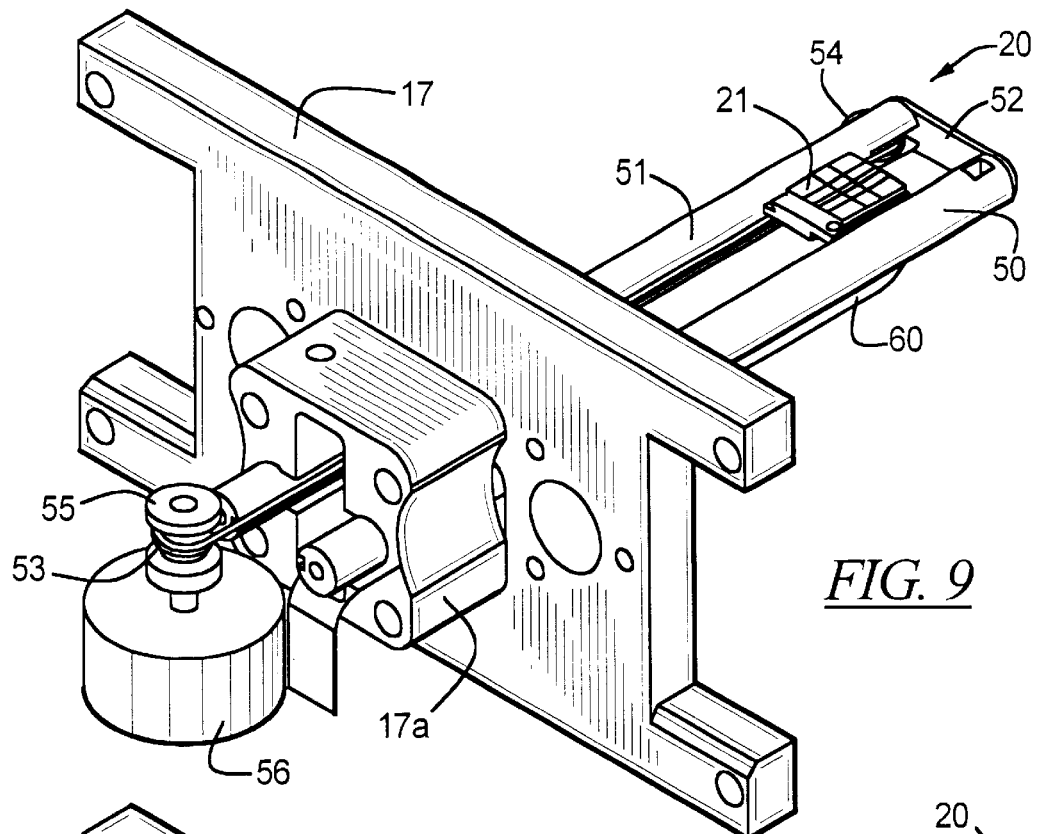
FIG. 9 is a perspective view of the basic components of a first embodiment of a read/write head positioning mechanism for use in the inventive tape drive.
Figure 12:
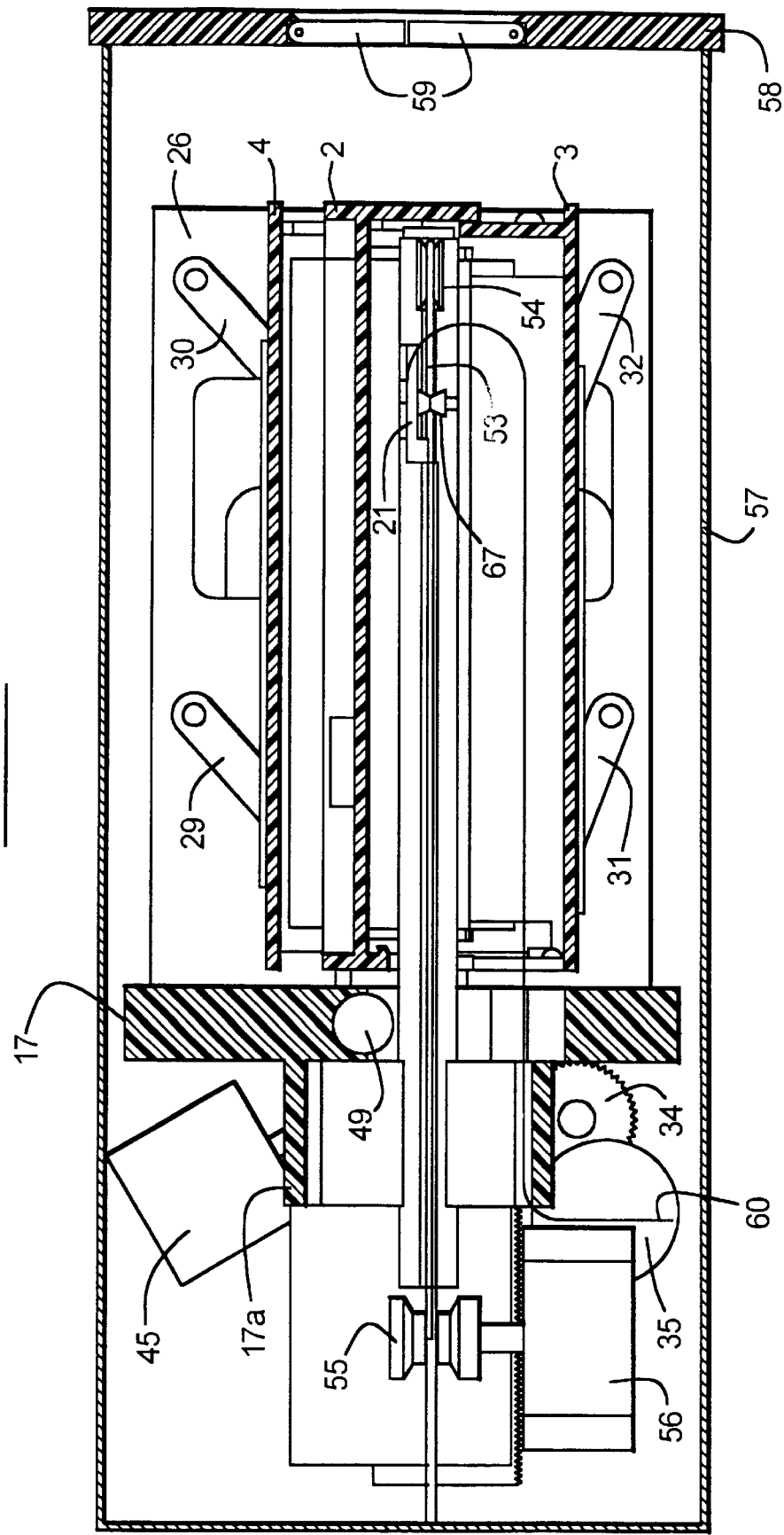
FIG. 12 is a side sectional view of the tape drive in accordance with the invention with the wide tape holding frame inserted therein.

As shown in FIG. 4 and FIG. 12, a bottom edge of the exterior wall 23 of each separating assembly 22 forms a toothed rack, which engages a gear 33 which, in turn, engages a drive gear 34 of a motor 35 (see FIGS. 8 and 12). Since the separator assemblies 22 are being manually pushed due to the abutment of the wide tape holding assembly 1 with the projections 25, this begins to cause rotation of the gear 33 which in turn begins to cause the drive gear 34 to be rotated. This slight rotation is sensed within the motor 35 and actuates the motor 35 to complete pulling the wide tape holding assembly 1, which is now positively engaged with the separator assemblies 22, into the drive 16, so that the drive shafts 19 become fully mechanically engaged with the tape hubs 7.

Each separator assembly 22 also includes an upper lifter 27 and a lower lifter 28. The upper lifter 27 is pivotably mounted to the guide 26 by levers 29 and 30, and the lower lifter 28 is pivotably mounted to the guide 26 by levers 31 and 32 (the lever 32 not being visible in FIG. 4, but being visible in FIG. 12). Each of the levers 29, 30, 31 and 32 has one end mounted by an axle to the guide 26 and an opposite end mounted by an axle to the respective lifter 27 or 28. The upper lifter 27 has a pin or roller 36 which proceeds through the guide 26 and engages an upper slot in the outer wall 23 of the separator assembly 22. Similarly, the lower lifter 28 has a pin or roller 37 which proceeds through the guide 26 and engages a mirror-symmetric lower slot in the outer wall 23. Each of these slots in the outer wall 23 has a relatively long horizontal portion connected to a relatively short horizontal portion by a vertical portion. For most of the insertion procedure the pins 36 and 37 respectively slide in the long horizontal portions of the slots, so that the lifters 27 and 28 follow the grooves 9 in the lateral sides of the wide tape holding assembly 1, with the wide tape holding assembly 1 being retained in the assembled condition shown in FIG. 1. Shortly after the aforementioned operation of the gripper heads 40 that releases the snap connection, thereby freeing the covers 3 and 4 from the frame 2, the continuing insertion, now controlled by the motor 35 pulling the separator assemblies 22, with the wide tape holding assembly 1 engaged therewith, toward the base plate 7, causes the pins 36 and 37 to reach the respective vertical portions of the slots in the respective outer walls 23, thereby causing the pins 36 and 37 to move apart, and thereby causing the upper and lower lifters 27 and 28 to pivot on their respective levers. This forces the freed bottom cover 3 and top cover 4 away from the frame 2, so that the wide tape holding frame 1 comes to a fully inserted position, as shown in FIGS. 11 and 12, whereby the top and bottom of the frame 2 are completely open (uncovered).

It is then possible, if necessary, for all of the tape 13 to be wound onto one tape pack, such as the tape pack 66 shown in FIG. 11, on one tape hub 7. This tape pack 66 has a diameter which exceeds the height of the frame 2, but this is permitted due to the removal of the covers 3 and 4 when the wide tape holding assembly 1 is in the drive 16. Respective light transmitters/receivers 38 disposed in the drive 16 in registration with the sight openings 11 detect the orientation of the flange 65. Another detector 68, as shown in FIG. 4, which may be an optical detector or a sonic detector, detects the position of the slider 41, or more precisely detects the position of the projection 43 thereof, so as to enable or disenable writing of data on the tape 13.

As shown in FIG. 8, the drive 16 also includes a cleaning assembly, formed by a cleaning assembly motor 45 having a drive shaft terminating in drive worm 46, which engages a worm gear 47 that is connected to a shaft 48, which carries a cleaning brush 49. In FIG. 8, the base plate 17 has been removed for clarity, however, all of these components are suitably mounted to the base plate 17 as shown in FIG. 12. When the read/write head 21 is moved by the head positioning assembly 20 to the position shown in FIG. 8, it can be cleaned by operating the motor 45 to rotate the brush 49. The read/write head may be simultaneously moved by the head positioning assembly 20 while the brush 49 rotates.

A first embodiment of the head positioning assembly 20 is shown in FIGS. 8, 9, 11 and 12. In this embodiment, the head 21 moves on rollers 67 (see FIG. 11) between support rods 50 and 51, which are held in a bracket 17a attached to the backside of the base plate 17. The rods 50 and 51 are connected at their opposite end by a connecting plate 52.

The rod 51 has a pulley 54 at the end thereof adjacent to the connecting plate 52. A thin cable 53, which may be a steel cable, for example, is entrained around the pulley 54 as well as around a drive pulley 55 operated by a head positioning motor 56. The cable 53 can be wound in several turns around the drive pulley 54 to avoid slippage.

The head positioning motor 56 can be a stepper motor with a resolution of 400 steps/revolution, as is standard for several types of commercially available stepper motors. If the drive pulley 55 has a diameter of 6 mm, the head 21 will move 47 microns/step. The drive 16, however, is intended to have a resolution of approximately 1 micron, and therefore a suitable fine positioning mechanism is additionally required. Such fine positioning mechanisms are known or can easily be devised. One example is to dispose a piezo-actuator in the connection between the head 21 and the cable 53. Another alternative is to employ suitable gearing between the motor 56 and the drive pulley 55.

Figure 10:
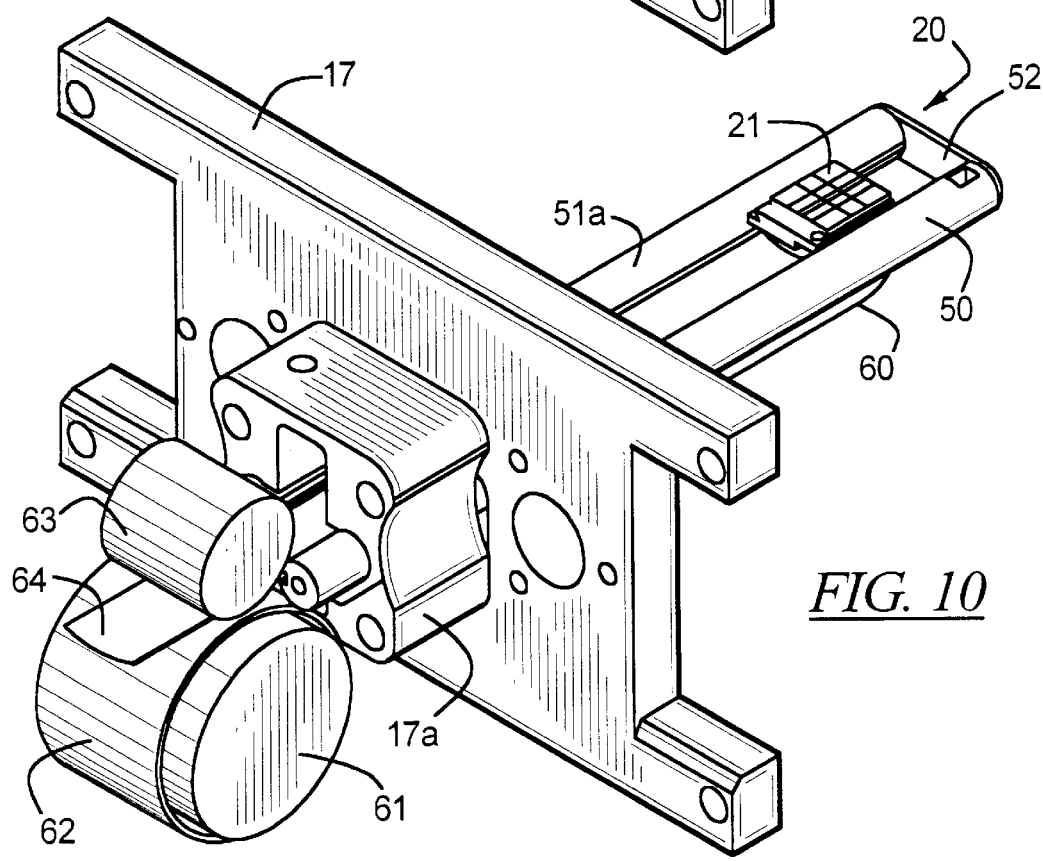
FIG. 10 is a perspective view of a second embodiment of a read/write head positioning mechanism for use in the inventive tape drive.

An electrical cable 60 for providing all suitable electrical connections to the head 21 is also shown in FIGS. 10 and 12.

Another embodiment of the head positioning assembly 20 is shown in FIG. 10. In this embodiment a stiff steel ribbon 64 is connected to the head 21, which rides between supporting rods 50 and 51a in the manner described in connection with the previous embodiment. The opposite end of the ribbon 64 proceeds through a nip between drive rollers 62 and 63. The drive roller 62 is driven by a head positioning motor 61, which can be of the same specifications as the motor 56. The ribbon 64 is sufficiently stiff so that it can pull as well as push the head 21 between the supporting rods 50 and 51a. A fine positioning mechanism as described above also can be used to augment the embodiment of FIG. 10.

Sectional views of the wide tape holding frame 1 in the inventive drive are shown in FIGS. 11 and 12. As can be seen in those figures, the drive has an exterior housing 57 with one wall formed by a front bezel 58. The bezel 58 has hinged doors 59 (commonly referred to as "saloon doors") allowing insertion of the wide tape holding frame 1 into the drive, as well as ejection therefrom.

When the wide tape holding frame 1 in the drive is to be ejected, the above-described procedure operates in a reverse sequence compared to that described above. The motors 35, for example, are caused to operate in the reverse direction by actuation of an "eject" button (not shown) in a known manner. Of course, optical and sonic controls alternatively can be used.

Although modifications and changes may be suggested by those skilled in the art, it is the intention of the inventors to embody within the patent warranted hereon all changes and modifications as reasonably and properly come within the scope of their contribution to the art.

We claim as our invention:

1. A tape drive for use with a wide tape holder having a frame with an open top and an open bottom non-permanently closed with a top cover and a bottom cover, releasably held together and releasably held to said frame by snap connections respectively disposed at lateral sides of said wide tape holder, said wide tape holder containing two tape hubs rotatably mounted therein proceeding substantially parallel to said lateral sides of said frame, said tape drive comprising:

a base plate;

two guides projecting substantially perpendicularly from said base plate and adapted to receive said wide tape holder therebetween with said lateral sides of said wide tape holder respectively engaging said guides;

at least one drive motor having a drive shaft disposed between said guides and adapted for insertion into and engagement with one of said tape hubs;

a magnetic read/write head;

a head positioning assembly mounted to said base plate between said guides on which said head is movably mounted, and adapted to project into said wide tape holder when said wide tape holder is disposed between said guides to position said head relative to said tape for data transfer between said head and said tape;

two grippers respectively mounted on said guides to engage and release said snap connections at said lateral sides of said wide tape holder as said wide tape holder is moved between said guides, thereby freeing said top cover and said bottom cover from said frame; and two lifter mechanisms respectively mounted on said guides for respectively engaging said top cover and said bottom cover after being freed from said frame to move said top cover and said bottom cover away from said frame to produce a spacing between said top cover and said bottom cover allowing all of said magnetic tape in said wide tape holder to be wound on one of said hubs.

2. A tape drive as claimed in claim 1 further comprising two separator assemblies respectively engaging said guides for sliding relative to said guides in a direction substantially parallel to said drive shaft, said separator assemblies respectively carrying said two grippers and said two lifter mechanisms.

3. A tape drive as claimed in claim 2 wherein each of said separator assemblies comprises a U-shaped element having an inner leg sliding in a channel in said guide at a side of said guide facing toward said drive shaft, and an outer leg disposed at a side of said guide facing away from said drive shaft.

4. A tape drive as claimed in claim 3 wherein each of the inner legs of said separator assemblies has a projection thereon projecting toward said drive shaft, said projection being adapted to abut said wide tape holder as said wide tape holder is inserted between said guides, thereby pushing said separator assemblies in the respective channels in said guides as said wide tape holder is further inserted.

5. A tape drive as claimed in claim 4 wherein each of said snap connections of said wide tape holder has an access opening, and wherein each of said grippers comprises a portion of the inner leg of said separator assembly that is mechanically biased away from said drive shaft and which has a gripper hook thereon, and a projection on said guide against which said gripper hook abuts as said separator assembly slides in said channel to force said gripper hook into said access opening to release said snap connection and positively engage said gripper hook with said wide tape holder.

6. A tape drive as claimed in claim 4 wherein each of said lifter mechanisms comprises an upper lifter and a lower lifter both pivotably mounted by respective levers to one of said guides, each of said upper lifter and said lower lifter having a pin projecting through said one of said guides, said outer leg of the separator assembly having mirror-symmetric slots therein respectively engaging said pins, said slots having a shape to initially allow the pins respectively therein to slide undisturbed as said wide tape holder is inserted between said guides, and to subsequently force said pins apart, thereby forcing said lifters apart after said grippers have released said snap connections, said upper and lower lifters being respectively adapted to engage said top cover and said bottom cover and to move said top cover and said bottom cover away from said frame.

7. A tape drive as claimed in claim 4 wherein the respective outer legs of the separating assemblies have an edge with a toothed rack thereon, and wherein said tape drive further comprises a pull-in/ejection motor having a drive gear engaging said rack, said pull-in/ejection motor being actuated by initial rotation of said drive gear caused by sliding of said separator assembly due to insertion of said wide tape holder abutted against said projection on said inner leg of said separator assembly.

8. A tape drive as claimed in claim 1 wherein each of said tape hubs in said wide tape holder has flanges, and wherein each of said flanges has a reflective surface thereon, and wherein said frame of said wide tape holder has sight openings therein disposed adjacent to said flanges, and wherein said wide tape drive has a light transmitter/receiver having field of view adapted to encompass said sight opening when said wide tape holder is fully inserted between said guides, to detect whether said reflective portion is in registration with said sight opening, and thereby identifying an orientation of said flange.

9. A tape drive as claimed in claim 1 wherein said wide tape holder has a manually actuatable slide in said frame, and wherein said tape drive comprises a detector adapted to detect a position of said slide when said wide tape holder is fully inserted between said guides, and wherein said detector enables transfer of data between said head and said tape dependent on the detected position of said slide.

10. A tape drive as claimed in claim 1 wherein said head positioning assembly comprises:
    two spaced-apart support rods mounted to said base plate and extending between said tape guides substantially parallel to said drive shaft;
    a sliding mount mounting said head to said support rods allowing said head to slide along said support rods;
    a positioner motor; and
    an adjustable connection between said sliding mount and said positioner motor for selectively moving said sliding mount, and thus said read head, to a position along said support rods.

11. A tape drive as claimed in claim 10 wherein said adjustable connection comprises a pulley disposed at an end of one of said support rods away from said base plate, a cable entrained around said pulley, and a drive pulley connected to said positioner motor around which said cable also is entrained.

12. A tape drive as claimed in claim 10 wherein said adjustable connection comprises a stiff ribbon slidable in respective slots in said support rods, and two rollers operated by said drive motor and forming a nip therebetween through which said ribbon proceeds.

13. A tape drive as claimed in claim 1 further comprising a head cleaning assembly mounted to said base plate for cleaning said head when said head is positioned near said base plate by said head positioning assembly.

14. A tape drive as claimed in claim 13 wherein said head cleaning assembly comprises a brush and a head cleaning assembly motor connected to said brush for rotating said brush.

15. A tape drive for use with a wide tape holder having a frame with an open top and an open bottom non-permanently closed with a top cover and a bottom cover, releasably held together and releasably held to said frame by snap connections respectively disposed at lateral sides of said wide tape holder and each having an access opening, said wide tape holder containing two tape hubs rotatably mounted therein proceeding substantially parallel to said lateral sides of said frame, said tape drive comprising:
    a base plate;
    two guides projecting substantially perpendicularly from said base plate and adapted to receive said wide tape holder therebetween with said lateral sides of said wide tape holder respectively engaging said guides;
    at least one drive motor having a drive shaft disposed between said guides and adapted for insertion into and engagement with one of said tape hubs;
    a magnetic read/write head;
    a head positioning assembly mounted to said base plate between said guides on which said head is movably mounted, and adapted to project into said wide tape holder when said wide tape holder is disposed between said guides to position said head relative to said tape for data transfer between said head and said tape;
    two separator assemblies respectively engaging said guides for sliding relative to said guides in a direction substantially parallel to said drive shaft;
    each of said separator assemblies comprising a U-shaped element having an inner leg sliding in a channel in one of said guides at a side of that guide facing toward said drive shaft, and an outer leg disposed at a side of that guide facing away from said drive shaft;
    each of the inner legs of said separator assemblies having a projection thereon projecting toward said drive shaft, said projection being adapted to abut said wide tape holder as said wide tape holder is inserted between said guides, thereby pushing said separator assemblies in the respective channels in said guides as said wide tape holder is further inserted;
    each of said inner legs having a portion that is mechanically biased away from said drive shaft and which has a gripper hook thereon;
    each of said guides having a projection against which said gripper hook abuts as said separator assembly slides in said channel to force said gripper hook into said access opening to release said snap connection to free said top cover and said bottom cover from said frame, and to positively engage said gripper hook with said wide tape holder; and
    an upper lifter and a lower lifter both pivotably mounted by respective levers to one of said guides, each of said upper lifter and said lower lifter having a pin projecting through said one of said guides, said outer leg of the separator assembly having mirror-symmetric slots therein respectively engaging said pins, said slots having a shape to initially allow the pins respectively therein to slide undisturbed as said wide tape holder is inserted between said guides, and to subsequently force said pins apart, thereby forcing said lifters apart after said gripper hooks have released said snap connections, said upper and lower lifters being respectively adapted to engage said top cover and said bottom cover and to move said top cover and said bottom cover away from said frame.

16. A tape drive as claimed in claim 15 wherein the respective outer legs of the separating assemblies have an edge with a toothed rack thereon, and wherein said tape drive further comprises a pull-in/ejection motor having a drive gear engaging said rack, said pull-in/ejection motor being actuated by initial rotation of said drive gear caused by sliding of said separator assembly due to insertion of said wide tape holder abutted against said projection on said inner leg of said separator assembly.

* * * * *